US012805459B2

(12) United States Patent
Vandame et al.

(10) Patent No.: US 12,805,459 B2
(45) Date of Patent: Nov. 24, 2026

(54) DECOUPLED AQUAPONICS SYSTEM IN MILDLY SALINATED WATER, AND PROCESS FOR FARMING AND CULTIVATING IN SUCH A SYSTEM

(71) Applicant: LA SOURCE, Montreuil (FR)

(72) Inventors: Romain Vandame, Rennes (FR); Jérémie Cognard, Rennes (FR)

(73) Assignee: LA SOURCE, Montreuil (FR)

(*) Notice: Subject to any disclaimer, the term of this patent is extended or adjusted under 35 U.S.C. 154(b) by 51 days.

(21) Appl. No.: 18/854,028

(22) PCT Filed: Apr. 4, 2023

(86) PCT No.: PCT/FR2023/050482
§ 371 (c)(1),
(2) Date: Oct. 3, 2024

(87) PCT Pub. No.: WO2023/194684
PCT Pub. Date: Oct. 12, 2023

(65) Prior Publication Data

US 2025/0221349 A1 Jul. 10, 2025

(30) Foreign Application Priority Data

Apr. 5, 2022 (FR) ....................................... 2203123

(51) Int. Cl.
*A01G 31/02* (2006.01)
*A01K 63/04* (2006.01)
*A01K 61/59* (2017.01)

(52) U.S. Cl.
CPC ............ *A01G 31/021* (2025.01); *A01K 63/04* (2013.01); *A01K 61/59* (2017.01)

(58) Field of Classification Search
CPC ........ A01K 61/10; A01K 61/59; A01K 63/04; A01G 31/021; A01G 31/023
See application file for complete search history.

(56) References Cited

U.S. PATENT DOCUMENTS 11,382,315 B2 * 7/2022 Merrill .................. A01K 61/10
2010/0269761 A1 * 10/2010 Nien ..................... A01K 63/04 119/261

(Continued)

FOREIGN PATENT DOCUMENTS

CN 217446147 U * 9/2022
DE 102017121990 A1 * 3/2019 ............ A01K 63/04

(Continued)

OTHER PUBLICATIONS

International Search Report for PCT/FR2023/050482, mailed Jul. 17, 2023, 5 pages.

(Continued)

*Primary Examiner* — Ebony E Evans
(74) *Attorney, Agent, or Firm* — NIXON & VANDERHYE

(57) ABSTRACT

The present invention relates to a decoupled aquaponics system comprising an aquaculture portion (1) and an agriculture portion (2), the aquaculture portion (1) comprising a farming pond (101) filled with water that has a salinity of greater than 2 g/l, and an aquaculture loop for circulating water in the aquaculture portion. The system further comprises a device for collecting water, allowing the extraction of water from the aquaculture portion (1). The agriculture portion (2) comprises a device for the soil-less cultivation of plants, and an irrigation system containing a nutrient solution that is supplied to the device for soil-less cultivation. The aquaponics system also comprises a buffer tank (3), the device for collecting water being configured to discharge water collected from the aquaculture portion (1) into the buffer tank (3). The aquaponics system further comprises a tank for preparing the nutrient solution, said tank for preparing the nutrient solution being at least partially supplied with water from the buffer tank (3). The invention also (Continued)

relates to a process for farming aquatic animals and for cultivating plants in an aquaponics system.

6 Claims, 1 Drawing Sheet

(56) References Cited

U.S. PATENT DOCUMENTS

| | | | | |
|---|---|---|---|---|
| 2015/0144069 | A1* | 5/2015 | Dickerson | C05F 17/40<br>119/230 |
| 2015/0196002 | A1* | 7/2015 | Friesth | A01K 63/04<br>315/297 |
| 2015/0296752 | A1* | 10/2015 | Shishehchian | A23K 50/80<br>119/234 |
| 2019/0166776 | A1 | 6/2019 | Villamar | |
| 2021/0227800 | A1* | 7/2021 | Goh | A01K 61/10 |
| 2023/0354786 | A1* | 11/2023 | Fischer | A01K 63/042 |

FOREIGN PATENT DOCUMENTS

| | | | | |
|---|---|---|---|---|
| FR | 3064446 | A1 * | 10/2018 | A01G 24/00 |
| WO | 2019057818 | A1 | 3/2019 | |

OTHER PUBLICATIONS

Written Opinion of the ISA for PCT/FR2023/050482, mailed Jul. 17, 2023, 8 pages.

* cited by examiner

DECOUPLED AQUAPONICS SYSTEM IN MILDLY SALINATED WATER, AND PROCESS FOR FARMING AND CULTIVATING IN SUCH A SYSTEM

This application is the U.S. national phase of International Application No. PCT/FR2023/050482 filed Apr. 4, 2023 which designated the U.S. and claims priority to FR 2203123 filed Apr. 5, 2022, the entire contents of each of which are hereby incorporated by reference.

The present invention relates to the field of aquaponics. The term "aquaponics" is formed by merging the words aquaculture (designating the farming of aquatic animals or other aquatic organisms) and hydroponics (cultivation of plants by water enriched with mineral materials).

In general, an aquaponics system refers to a production system that combines aquaculture and agricultural production, in this case hydroponics. In this context, aquaculture corresponds to the production of aquatic organisms, in particular aquatic animals (fish, crustaceans or molluscs), under controlled conditions whether in fresh, mildly salted, brackish, or marine water.

One of the general ideas underlying the principle of aquaponics is that the ammonia contained in the urine and excrement of aquatic organisms that are raised in the aquaculture portion of the system can form nutrients, nitrates in particular, which can be assimilated by the plant(s) cultivated in the agriculture portion.

The principle of aquaponics has been known for a very long time. However, it is currently attracting significant interest in a context where environmental and nutritional issues are increasing, with for example the development of short consumption circuits for cultivation and farming, and generally the need for local production of products cultivated or farmed in an environmentally friendly manner.

Many aquaponics systems have been developed in this way and are described in the literature.

Most of the systems considered are systems called "coupled" systems. In a coupled system, water used for aquaculture farming then or jointly allows to cultivate plants, while water used for cultivating plants then or jointly allows aquaculture farming. In other words, either the aquatic plants and animals grow in the same pond, or all or part of the water used for cultivating the plants is returned to the aquaculture portion.

This is how document U.S. Pat. No. 10,548,269 describes a coupled aquaponics system, wherein animals, typically fish, are farmed in salt water, while plants adapted to be cultivated in a salty environment are cultivated in mediums that float on the water wherein the aquatic animals are farmed. A first plant purifies the water, and a second plant oxygenates it. Oxygenation of the water allows the animals in the aquaculture farm to live, and the aquaculture farm in turn provides nutrients for the plants.

Document WO201617202 discloses another coupled aquaponics system. This document describes and claims a complete aquaponics system including devices for circulating, filtrating and controlling the properties of the fluids which circulate in the system from the aquaculture portion to the agriculture portion and vice versa. The farming of fish or shrimp is considered in this document.

Document WO2019057818 presents yet another aquaponics system. This document discloses a system including two systems, respectively aquaculture and hydroponic systems, which are managed independently.

The aquaculture system and the hydroponic system communicate with each other, with water from the aquaculture system being treated to remove solid residues and form a nutrient-rich solution for the plants, while water from the hydroponic system is distilled to dilute the water in the aquaculture system. In particular, a set of treatments allows the extraction of solid residues from the aquaculture system to create a nutrient-enriched solution for the agricultural system, while a distiller allows water from the agricultural system to be demineralized to send it to the aquaculture system and dilute the water present therein. This implies that the aquaponics system must operate in fresh water, otherwise salt accumulation would occur in the agricultural system.

According to another considered configuration, the aquaponics system can include an agricultural, hydroponic portion, without there being provision for a return of water from the agriculture portion to the aquaculture portion.

The article *Co-culture of shrimp with commercially important plants: a review* by Juan Francisco Fierro-Sañudo, Frederico Paez-Osuna and Gustavo A Rodriguez Montes de Oca published in Reviews in Aquaculture in November 2020 thus presents a synthesis of more than 158 studies published on shrimp farming carried out jointly with plant cultures, in more or less salty environments. This study in particular considers an aquaponics system including the irrigation of various plants cultivated in open fields.

However, aquaponics systems described in the prior art can be optimized in many aspects. In particular, no system is known that allows very high-density shrimp farming coupled efficiently, particularly with regard to water supply, to an agricultural crop.

Thus, the present invention relates to a decoupled aquaponics system comprising an aquaculture portion and an agriculture portion. The aquaculture portion comprises a farming pond adapted for cultivating aquatic animals filled with water that has a salinity greater than 2 g/L, and an aquaculture loop for circulating water between a water outlet of the farming pond and a water inlet of the farming pond. The system further comprises a device for collecting water allowing the extraction of water from the aquaculture portion. The agriculture portion comprises a device for the soil-less cultivation of plants and an irrigation system containing a nutrient solution that is supplied to the device for the soil-less cultivation of plants. The system comprises a buffer tank, the device for collecting water being configured to discharge the water collected from the aquaculture portion into the buffer tank. The system further comprises a tank for preparing the nutrient solution, said tank for preparing the nutrient solution being at least partially supplied with water from the buffer tank.

"Decoupled aquaponics system" means an aquaponics system whose aquaculture and agriculture portions can be managed and controlled independently.

Salinity is defined as the amount of salts dissolved in a liquid, that is to say the mass content of salts. The main dissolved salts are chlorine, sodium, magnesium, sulfate, calcium, potassium, etc. The configuration of the aquaponics system allows in particular to extract water from the aquaculture portion before its properties become imperfect for the proper growth of the aquatic animals cultivated, and while its properties are suitable to serve as a basis for the preparation of a nutrient solution adapted for the cultivation of plants in the agriculture portion.

The aquaponics system may include means for measuring the salinity of the water in the aquaculture portion and nitrogen parameters, in particular means for measuring nitrates, in the water in the aquaculture portion.

The system may also include means for measuring alkalinity in the water of the aquaculture portion.

The aquaculture loop may include a mechanical filter.

The aquaculture loop may include a denitrator. A denitrator, or denitrifying device, generally includes an anaerobic filter allowing denitrification of the water.

The aquaculture loop may include a degassing device and/or an aerobic biological filter.

The farming pond can contain shrimp. The farming pond can contain more than 6 kg of shrimp per cubic meter of water.

Such density can be achieved in particular at the end of the farming period, when the shrimp have reached the desired size for fishing.

The agriculture portion may include at least two irrigation systems, namely a first irrigation system supplying a first soil-less cultivation system and a second irrigation system supplying a second soil-less cultivation system, and wherein the first irrigation system contains a first nutrient solution containing water directly from the buffer tank, and wherein the second irrigation system contains a second nutrient solution containing water directly from the buffer tank and optionally containing drainage from the first irrigation system.

The drainage of the first irrigation system corresponds to the solution recovered at the outlet of this first irrigation system.

The aquaponics system may include first plants cultivated in the first soil-less cultivation system, namely fruit plants, preferably tomatoes, and including second plants cultivated in the second soil-less cultivation system, namely leafy plants.

Leafy plants include leafy vegetables, that is to say vegetables whose consumed portion (or at least one consumed portion) corresponds the to leaves. This includes cruciferous or brassica plants, aromatic plants, and certain shoots (for example, beet shoots).

"Fruit plants" means all plants that produce fruit, preferably edible fruits.

Fruit plants and leafy plants are cultivated on cultivating media suitable for the soil-less cultivation.

Possible cultivating media for fruit plants and/or leafy plants include cultivating substrates, in particular fibrous substrates, floating media, and any other form of media adapted for root development.

For example, fruit plants and leafy plants are respectively cultivated on a fibrous substrate or on an impermeable floating medium including through orifices adapted to receive roots of said leafy plants.

For example, fruit plants may be cultivated on a fibrous substrate, and leafy plants may be cultivated on an impermeable floating medium including through orifices adapted to receive roots of said leafy plants.

The system may include a sensor adapted to measure electro-conductivity in the fibrous substrate.

The invention also relates to a process for farming aquatic animals and for cultivating plants in an aquaponics system, the process including:

- farming aquatic animals in an aquaculture portion containing water with a salinity greater than 2 g/L,
- cultivating plants, supplied with nutrient solution by an irrigation system, The cultivation of the plants is carried out above ground and the process includes:

- measuring at least daily the salinity in the water of the aquaculture portion, and
- measuring at least daily the nitrates in the water of the aquaculture portion, and, if the salinity exceeds a given salinity threshold, and/or if the nitrates exceed a given nitrate threshold:

- extracting water from the aquaculture portion,
- adding new water to the aquaculture portion, to compensate for the extracted water, the process further including preparing the nutrient solution, said nutrient solution including water extracted from the aquaculture portion.

The aquatic animals more particularly considered include fish and crustaceans, in particular shrimps, particularly Penaeus Vannamei shrimps.

The process may comprise storing water extracted from the aquaculture portion in a buffer tank.

The given salinity threshold can for example be comprised between 3 g/L and 8 g/L. and the given nitrate threshold can for example be comprised between 100 mg/L and 300 mg/L.

The preparation of the nutrient solution may include:

- providing water extracted from the aquaculture portion,
- providing inputs,
- optionally providing fresh water, and
- mixing the water extracted from the aquaculture portion, inputs and optionally fresh water.

Inputs may be supplied directly, for example in the form of powders, or supplied contained in a stock solution. Stock solution refers to a solution rich in inputs, which may be obtained by mixing inputs in water from the aquaculture portion (via the buffer tank) or in fresh water.

Throughout this document, the concept of fresh water refers to water with a salinity of less than 1 g/L of salts.

The process may include the preparation of two nutrient solutions, namely a first nutrient solution and a second nutrient solution,

- the preparation of the first nutrient solution including:
- providing water extracted from the aquaculture portion,
- providing inputs contained in a stock solution, and
- mixing the water extracted from the agriculture portion and the stock solution, and diluting with fresh water;
- the process including irrigating, by a first irrigation system, first plants with the first nutrient solution,
- the preparation of the second nutrient solution including:
- providing water extracted from the aquaculture portion
- providing drainage of the first irrigation system;
- mixing the water extracted from the aquaculture portion and the drainage of the first irrigation system and optionally adding inputs;

the process including irrigating, by a second irrigation system, second plants with the second nutrient solution.

The inputs may include one or more of the following inputs:

- calcium nitrate;
- potassium nitrate;
- monopotassium phosphate;
- one or more organic inputs;
- iron chelate;
- mixture of trace elements;
- manganese;
- nitric acid;
- hydrochloric acid;
- sulfuric acid;
- orthophosphoric acid.

Other features and advantages of the invention will become apparent in the description below.

In the appended drawings, given as non-limiting examples:

Figure 2:
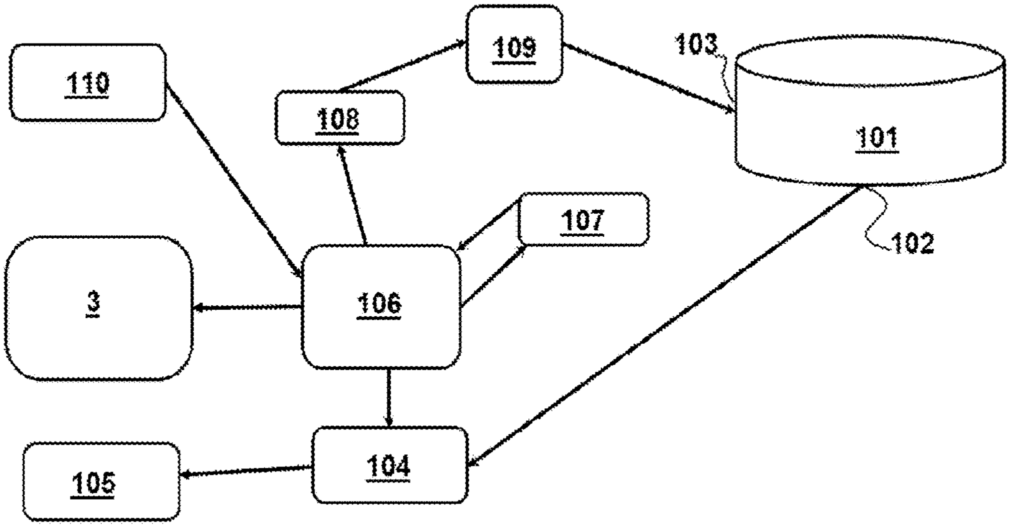
FIG. 2 represents, according to a block diagram, the aquaculture portion of an example of an aquaponics system in accordance with one embodiment of the invention, for example the aquaponics system of FIG. 1.
Figure 3:
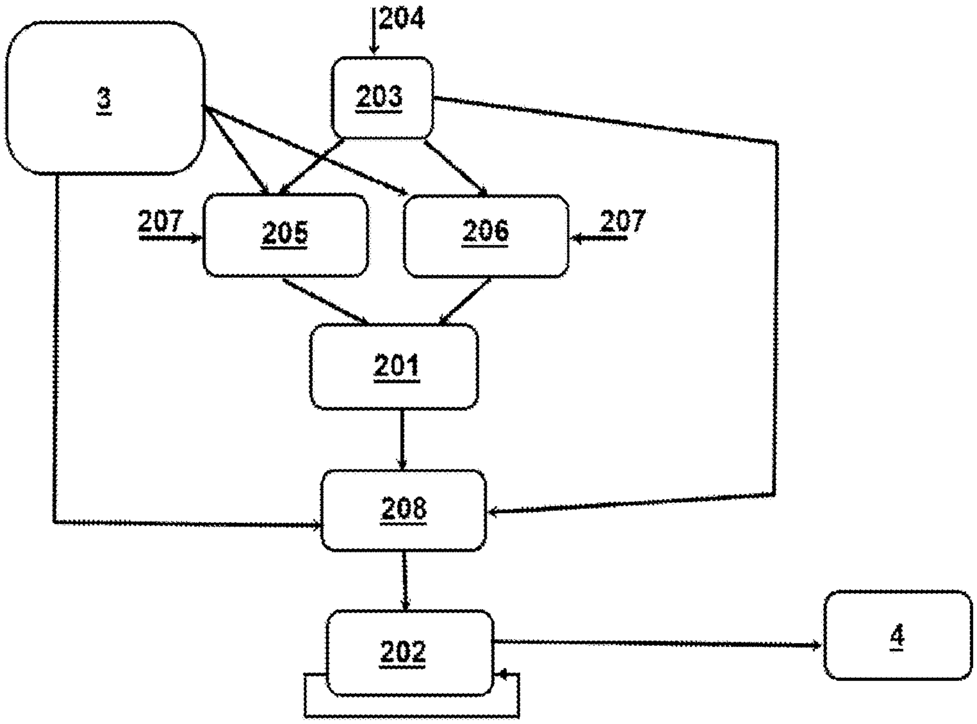
FIG. 3 represents, according to a block diagram, the agriculture portion of an example of an aquaponics system in accordance with one embodiment of the invention, for example the aquaponics system of FIG. 1.

An aquaponics system in accordance with the present invention includes an aquaculture portion 1, an example of which is shown in FIG. 2, and an agriculture (hydroponic) portion 2 shown in FIG. 3.

According to the invention and as described in more detail below, the aquaculture portion 1 and the agriculture portion 2 are in interface in that the water from the aquaculture portion 1 is used for irrigating the plants of the agriculture portion 2. However, there is no direct return of water from the agriculture portion 2 to the aquaculture portion 1. The aquaculture portion and the agriculture portion can be managed, in particular with regard to the properties of the water they contain, as described below, independently. The system proposed in the invention is thus a decoupled aquaponics system. Furthermore, the aquaculture portion and the agriculture portion e managed independently. By independently it is understood that the respective control systems of these portions are independent, the properties of the water leaving the aquaculture portion 1 to be used for irrigation in the agriculture portion 2 can nevertheless influence the management of the agriculture portion 2.

In the example shown, when water is extracted from the aquaculture portion 1, it is discharged into a buffer tank 3. The buffer tank 3 supplies (in whole or in part, as described with reference to FIG. 2) the agriculture portion 2. Finally, any effluent from the agriculture portion is removed from the system to be released or treated as needed.

FIG. 2 thus represents the aquaculture portion 1 of such an aquaponics system.

The aquaculture portion includes a farming pond 101. The farming pond contains aquatic animals, preferably crustaceans, preferably shrimps. More particularly, the system which is the object of the present invention is particularly adapted for farming shrimps, in particular Penaeus Vannamei shrimps (also called Litopenaeus Vannamei). The farming pond 101 allows the growth of shrimp in a water called mildly salted water, greater than 1 g/L but less than 10 g/L.

Salinity is defined as the amount of salts dissolved in a liquid, that is to say the mass content of salts. The main dissolved salts are chlorine, sodium, magnesium, sulfate, calcium, potassium, etc. Thus, it includes in particular the content of ions: Chloride ($cl^-$), Sodium ($Na^+$), Sulfate ($SO_4^{2-}$), Magnesium ($Mg^{2+}$), Calcium ($Ca^{2+}$), Potassium ($K^+$), etc. Salinity is measured from the electrical conductivity of water, at a given temperature and pressure. In particular, the electrical conductivity of water can be measured using a conductivity meter. This conductivity thus reflects the presence of ions in the solution, in particular Chloride ($Cl^-$), Sodium ($Na^+$), Sulfate ($SO_4^{2-}$), Magnesium ($Mg^{2+}$), Calcium ($Ca^{2+}$), Potassium ($K^+$), etc.

The present invention, one embodiment of which is detailed with reference to FIGS. 1 to 3, aims in particular at allowing shrimp farming with a very high density of shrimp. The density in the farming pond can thus be greater than 6 kg of shrimp per cubic meter of water, advantageously greater than 10 kg/m3 and up to 20 kg/m3 or even more. Reduced to the number of Penaeus Vannamei shrimp, the shrimp density can thus be higher than 0.4 shrimp per liter of water in the farming pond, and up to more than 1.2 shrimp per liter of water in the farming pond at the end of the farming period, when the shrimp have reached the desired size for fishing.

The expression "farming pond" can of course collectively designate a group of several ponds where shrimp or other aquatic animals are farmed.

An aquaculture loop allows water to circulate, in a closed circuit, between a water outlet 102 of the farming pond 101 and a water inlet 103 of the farming pond 101.

The aquaculture loop includes a number of devices for treating the water in the aquaculture portion. The aquaculture loop shown thus includes a mechanical filter 104 for mechanically filtering the water from the farming pond 101. The purpose of mechanical filtration is to separate solid elements of a given size or larger present in the water. The mechanical filter 104 may be of different types. In particular, it may be a mesh filter. It may be a drum filter, which includes a rotating filter for capturing and separating the solid elements from the water. Preferably, the mechanical filter is a filter suitable for removing particles larger than 100 micrometers, preferably larger than 60 micrometers. These solid elements are then discharged from the aquaculture loop, thus becoming solid effluents 105 of the aquaponics system. The solid effluents 105 also comprise sludge. Solid effluents, rich in nitrogen, can be recovered, particularly as organic fertilizers.

In conjunction, where appropriate, with the biological filter described below, the mechanical filter allows to maintain the farming in clear water. Clear water means water whose mass concentration of suspended solids is less than 100 mg/L, preferably less than 80 mg/L, even more preferably less than 50 mg/L. Once filtered, the water from the farming pond is sent to a recovery tank 106. The recovery tank 106 constitutes a water reserve facilitating the management of the quality and quantity of the water present in the aquaculture portion 1 of the aquaponics system.

A denitrator 107 is provided, in parallel with the recovery pond 106.

The denitrator 107, or denitrifying device, is a device allowing the formation of dinitrogen from nitrates present in the water. Therefore, it allows to limit, stabilize, or slow down the progression of the quantity of nitrates in the water of the aquaculture portion. It is based on the colonization of a neutral substrate by bacteria that use a carbon source, typically alcohol such as ethanol, to transform nitrates into dinitrogen. In a denitrator, the denitrifying bacteria catalyze the reduction of the nitrate ion ($NO_3^-$) into dinitrogen ($N_2$) according to the following reaction: $NO_3^- + 6H^+ + 5e^- \rightarrow \frac{1}{2}N_2 + 3H_2O$.

The denitrator thus allows to control the quantity of nitrates and more generally the nitrogen parameters present in the water. This allows to limit the quantity of water to be replaced in the aquaculture portion according to the processes described below.

The aquaculture loop further includes an aerobic biological filter 108. The aerobic biological filter 108 allows nitrification, that is to say the transformation by nitrifying organisms of ammoniacal nitrogen into nitrates during two successive reactions. The first reaction is a nitrosation reaction, which is the transformation of ammonia ($NH_4^+$) into nitrite ion ($NO_2^-$) by nitrous bacteria. The second reaction is a nitration reaction, which is the transformation of nitrite ions into nitrate ions ($NO_3^-$). Nitrate ions can be assimilated by plants and less toxic than ammonium. The aerobic biological filter 108 therefore allows to adapt the quantity of organic matter present in the water from the recovery pond 106.

Finally, a degassing device 109 allows, if necessary, the release of gases dissolved in the water before the water is reintroduced into the farming pond 101 via the water inlet 103. Various degassing devices are conceivable. The most common degassing devices operate by mechanical agitation of the water. The degassing device 109 allows in particular the release of carbon dioxide dissolved in the water. It allows the pH of the water to be raised if necessary, without increasing its alkalinity.

Water management, in order to maintain desired features, also involves extracting water from the aquaculture portion to the buffer tank 3, and supplying water as compensation from a new water source 110. Water extraction, using a sampling device, is carried out punctually according to needs. Water extraction can be carried out from different areas of the aquaculture portion, that is to say not necessarily from the farming pond.

The new water source 110 corresponds to a tank or a water network allowing the introduction into the aquaculture portion (at the aquaculture loop or the farming pond 101) of water whose properties allow to compensate for any drifts in the properties of the water present in the aquaculture portion. For example, network water, or borehole or spring water, can be supplemented in a dedicated pond to form new water having the desired properties. The properties of the water include in particular salinity, pH, nitrogen parameters (in particular nitrates), and alkalinity.

For example, between 1% and 10%, and for example 3% of the water present in the aquaculture loop can be extracted each day from the aquaculture portion, an equivalent or substantially equivalent quantity of new water being added as compensation. The added quantity also allows to compensate for evaporation and/or possible leaks in the system.

The amount of water extracted depends on the evolution of the properties of the water in the aquaculture portion, said properties can nevertheless be regulated to a certain extent by the devices it contains (for example, as explained above, the denitrator 107 can control the increase of nitrates in the water, at least to a certain extent), or by the addition of adapted products.

The water requirements of the agricultural (hydroponic) part can also be taken into consideration for the water extraction of the aquaculture portion.

The following properties of the water present in the aquaculture loop are monitored by measurements at an adapted frequency. The monitoring of the properties can be done using any suitable method known to the person skilled in the art in the prior art. Depending on the property in question, its measurement can be carried out, for example, weekly, bi-weekly, daily, twice a day, or "continuously" (that is to say the measurement is sufficiently frequent to observe a regular variation, without a sudden "jump" in the measured value, so that at any time the measured value can be known precisely).

For example, the following properties of the water in the aquaculture portion can be measured at an adapted frequency, for example continuously, at one or more points in the aquaculture portion, in particular in the farming pond (or in the various ponds forming the farming pond):

the dioxygen ($O_2$) dissolved in the water;
the pH;
the temperature;
the salinity;

Daily measurements can be taken for:
nitrogen parameters (NH4+/NO2−/NO3−);
total alkalinity.

Less frequently, for example every two days or twice a week, measurements can be taken for cation concentrations: Na+/K+/Mg2+/Ca2+.

A weekly measurement of the redox potential can be carried out.

Obviously, the frequencies mentioned above are for information purposes only and can be adapted, in particular depending on the particular aquaponics system considered, or in particular if possible deviations observed in the properties of the water require more regular monitoring of these properties.

The aquaponics system can therefore include permanently installed sensors, or sensors placed by an operator to take a measurement (for example manual sensors).

Ranges of values have been defined for the above-mentioned water properties, or for certain pairs of properties. For example, the pair formed by salinity and nitrates is very relevant because the toxicity of nitrates for shrimps depends on salinity.

Remaining in the defined ranges may require certain measures, for example activating the denitrator 107 or adding certain products, in particular mineral salts, to the water, for example in the recovery pond 106.

The added products can thus be: sodium bicarbonate, soda, calcium oxide or calcium carbonate to compensate for a decrease in alkalinity and/or pH.

Moreover, the extraction of water from the aquaculture portion to the buffer tank 3 is advantageously carried out according to certain properties of the water. Indeed, it is appropriate to maintain water whose quality allows shrimp to be raised at high density. (or, where appropriate, other aquatic animals) in the water, while providing an effluent of interest for hydroponic cultivation, particularly rich in nitrates, but relatively poor in salt.

Thus, it may be decided to extract water from the aquaculture portion 1, by sending it to the buffer tank 3, when the water reaches or exceeds a given salinity threshold. This threshold is for example comprised between 3 g/L and 10 g/L, and advantageously comprised between 3 g/L and 8 g/L.

Similarly, it may be decided to extract water from the aquaculture portion 1, by sending it to the buffer tank 3, when the nitrates reach or exceed a given nitrate threshold. This threshold is for example comprised between 100 mg/L and 300 mg/L, and advantageously comprised between 150 mg/L and 250 mg/L, for example 200 mg/L or approximately 200 mg/L.

Throughout the patent application, "approximately" or "of the order of" means the indicated value plus or minus 10%.

In this patent application, unless otherwise indicated, all limits of the ranges of values indicated are comprised in the considered range.

In certain salinity or nitrate ranges, the ratio between these two properties can be taken into account in the decision to extract water from the aquaculture portion.

Moreover, alkalinity can be monitored and controlled by adding more or less bicarbonate to the water in the aquaculture area.

Furthermore, it may be decided to extract water from the aquaculture portion 1, sending it to buffer tank 3, as long as the total alkalinity, defined by the CaCO3 equivalent content of the water, does not exceed a given threshold. This threshold may be comprised between 100 and 300 mg/L, it may be 150 mg/L or about 150 mg/L. When the total alkalinity is above this threshold, it may be decided to reduce water extraction and reduce sodium bicarbonate inputs so that the total alkalinity falls below the given threshold.

Replacing extracted water with new water with suitable properties can restore the water properties to a desired level. For example, if water is extracted because its salinity becomes too high, new water with a low salt content or even new fresh water can be introduced to compensate for the extracted water.

The new water supplied can thus be mains water, borehole water or spring water, supplemented by adding various salts, in particular:

- aquaculture salt (commercially available for the formation of artificial seawater),
- ethylenediaminetetraacetic acid.

The aquaculture loop presented in FIG. 2 corresponds to a particularly optimized loop. Obviously, the present invention is not limited to this exemplary embodiment, and certain alternative embodiments (in particular not including all the devices present in the aquaculture loop described, or including other devices) can be considered without departing from the scope of the present invention.

Figure 1:
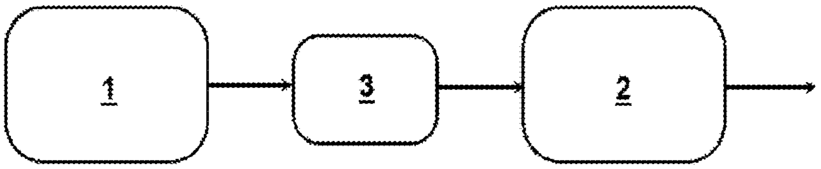
FIG. 1 represents, according to a block diagram, an aquaponics system in accordance with one embodiment of the invention.

FIG. 3 represents the agriculture hydroponic portion 2 of an aquaponics system according to one embodiment of the invention, such as that represented in FIG. 1.

The interface with the aquaculture portion is carried out via the buffer tank 3.

The agriculture portion 2 is advantageously used for cultivating conventional vegetables, in particular tomatoes, and/or mesclun, and/or aromatic plants.

The agriculture portion includes, in the example shown, a first irrigation system 201 intended for cultivating first plants, and a second irrigation system 202 intended for cultivating second plants. The crops grown in the agriculture portion are soil-less crops. The concept of irrigation system thus refers to a device allowing the irrigation of plants, that is to say the supply of nutrient solution to their roots, via their cultivating medium.

An irrigation system may therefore include, depending on the type of soil-less cultivation system considered, and for example, a pond, which is more or less deep, a set of open pipes of the gutter type containing the nutrient solution, or else a drip or "dripper" type system to bring the nutrient solution to the cultivation medium, for example a cultivation substrate.

In the example shown, the first irrigation system 201 is intended for irrigating fruit plants (as first plants) cultivated in a first soil-less cultivation system, and the second irrigation system 202 is intended for irrigating "leaf" plants (as second plants), cultivated in a second soil-less cultivation system.

The fruit plants more particularly considered within the framework of this aquaponics system are tomatoes, in particular cherry tomatoes.

Cultivated leafy plants may in particular be cruciferous plants. Cruciferous plants that are more specifically considered include cultivated rocket (*Eruca sativa*), Chinese mustard (*Brassica juncea*), Pak Choi (*Brassica rapa* L. subsp. *chinensis*), and Mizuna (*Brassica rapa joponica*).

For the cultivation of fruit plants, in particular tomatoes, a nutrient solution (first nutrient solution) must be prepared for use in irrigation. Tomatoes are referred to hereinafter as a preferred example, without however excluding the cultivation of other fruit plants, mutatis mutandis.

Tomatoes are advantageously cultivated on a fibrous cultivating substrate, for example rock wool in blocks, and in particular rock wool blocks with vertically oriented fibers (the vertical direction being defined when the block is in the position of use to accommodate the roots of the tomatoes). This type of substrate proves to be very draining, which prevents the accumulation of salts from the irrigation water in the substrate. The first irrigation system 201 may include a dripper which distributes water on the cultivating substrate. The first irrigation system 201, in the example presented, is not "recirculating", that is to say that the first nutrient solution is not recycled to be supplied again to the tomatoes.

By adjusting the quantity of water supplied, a large proportion of the water supplied is consumed by the tomatoes. For example, only about 30% of the volume of the nutrient solution supplied is recovered at the outlet of the first irrigation system 201 in the form of a solution called drainage solution. Obviously, the nutrient solution that irrigated the tomatoes and that is recovered at the outlet of the first irrigation system no longer has the same properties as the initial nutrient solution.

The first nutrient solution is obtained on the basis of water from buffer tank 3, that is to say water extracted from agriculture portion 1 under the conditions described with reference to FIG. 2. This water is particularly rich in nitrogen parameters, in particular nitrates.

In the example shown, two separate nutrient solutions are made for cultivating tomatoes. These two solutions are obtained by diluting the same stock solution with water from the buffer tank 3 and fresh water.

The stock solution 203 includes fresh water and inputs 204. The stock solution therefore allows to provide the inputs in a form that is simple to implement to form the desired solution.

The inputs may in particular include one or more of the following elements:

- calcium nitrate;
- potassium nitrate;
- monopotassium phosphate;
- one or more organic inputs
- iron chelate
- a mixture of trace elements
- manganese
- nitric acid
- hydrochloric acid;
- sulfuric acid
- orthophosphoric acid.

A first solution for fruit plants 205 is obtained by diluting the stock solution with water from the buffer tank 3 and fresh water 207 so as to obtain a first percentage of fresh water in the first solution for fruit plants 205.

A second solution for fruit plants 206 is obtained by diluting the stock solution with water from the buffer tank 3 and fresh water 207 so as to obtain a second percentage of fresh water in the second solution for fruit plants 206.

The second percentage of fresh water is greater than the first percentage of fresh water.

As a simple example, the first percentage of fresh water can be comprised between 10% and 40% by volume, the second percentage of fresh water can be comprised between 41% and 70% by volume.

Of course, alternatively, the first solution for fruit plants 205 and the second solution for fruit plants 206 can be respectively obtained by adding the inputs to water from the buffer tank 3 then diluting the stock solution thus obtained with fresh water, with the respective desired dilution rate.

Other methods for preparing nutrient solutions can of course be considered within the framework of the present invention.

The selection of the fruit plant solution used to irrigate the tomatoes, between the first fruit plant solution and the second fruit plant solution, results from a very fine management of the cultivating conditions, and can thus depend on one or more of the following elements:

the time of day (given by the hour);

the weather forecast for the hours and/or days to come;

the weight of the cultivating media (in this case the substrate blocks);

the air temperature around the tomatoes;

the brightness; and the electro-conductivity in the substrate.

Regarding the electro-conductivity in the substrate, it is remarkable to note that it is here controlled upwards, and not downwards as is the case in conventional agricultural crops. Indeed, generally electro-conductivity is measured to control the amount of nutrients present in the water. In conventional agricultural systems, which use fresh water, a drop in electro-conductivity is thus expected and monitored, in order to know when the water must be renewed or enriched. In the context of agriculture portion 2 of an aquaponics system according to the present invention, the water used has a certain salinity, which is the property of water that mainly influences its electro-conductivity. Thus, it is above all the increase in salinity, which can be problematic for cultivated plants, which is monitored via the increase in electro-conductivity that it causes, in order to take the necessary corrective measures (for example, a supply of fresh water or soft nutrient solution, that is to say whose salinity is less than 1 g/L of salts, or having a low salinity, typically less than 2 g/L).

For the cultivation of leafy plants, a second nutrient solution must be obtained. The second nutrient solution 208 is obtained on the basis of water from the buffer tank 3, that is to say water extracted from the agriculture portion 1 under the conditions described with reference to FIG. 2.

The leafy plants may be cultivated on impermeable mediums that float or are disposed on the surface of the second nutrient solution, and including through orifices adapted to receive roots of said leafy plants. The second irrigation system 202 may thus advantageously include a pond, in particular a shallow pond filled with the second nutrient solution. Shallow means a water height of less than 20 cm, advantageously less than 10 cm.

The cultivating media may in particular be formed of rafts which are formed of a floating shelf including through orifices adapted and intended to receive roots of said cruciferous plants, which can thus reach the second nutrient solution on which the raft floats. As an example, the rafts known and successfully used in the embodiment described here include approximately 1000 orifices per square meter. The medium being moreover impermeable, in that it is little or not at all saturated with second nutrient solution and in that the roots of the second plants do not or little develop therein, there is no risk of accumulation of mineral salts in the cultivating media.

In addition to the water from the tank 3, the second nutrient solution may also optionally include the first nutrient solution from the first irrigation system 201, after this first nutrient solution has irrigated the tomatoes. This drainage water from the first irrigation system may represent, for example, up to 50% of the volume of the second nutrient solution 208 that is formed. Acids are then added to obtain a pH located in a desired pH range for cultivating the cultivated leafy plants.

If the second nutrient solution is formed without water from the first irrigation system, inputs are added to the water from the buffer tank 3 (and therefore from the aquaculture portion).

The inputs may include one or more of the following elements:

iron chelate;

one or more organic inputs;

a mixture of trace elements;

manganese;

nitric acid;

hydrochloric acid;

sulfuric acid;

orthophosphoric acid.

Organic inputs include in particular organic liquid fertilizers.

It should therefore be noted that the cultivation of fruit plants is optional in the proposed system. An aquaponics system according to certain embodiments of the invention may be devoid of cultivation of fruit plants in its agriculture portion, and/or the cultivation of fruit plants may be seasonal.

The second irrigation system 202 causes a recirculation of the second nutrient solution. Thus, the second nutrient solution can be used to irrigate the second plants until its nitrate and/or phosphorus content falls below a threshold set respectively for these elements.

Typically, the second nutrient solution may be used until the nitrate content is below a threshold comprised between 50 mg/L and 0 mg/L, preferably between 30 mg/L and 0 mg/L; and/or the second nutrient solution may be used until the phosphorus content is below a threshold comprised between 10 mg/L and 0 mg/L, preferably between 5 mg/L and 0 mg/L.

In the embodiment shown in the figure, and as described above, the first irrigation system 201 is not "recirculating". It is however possible, in an alternative embodiment, to provide for a recirculation of all or part of the effluent to form a new quantity of nutrient solution for fruit plants, which will be supplied to the tomatoes (or other fruit plants). In this case, the cultivation of leafy plants may be optional.

The effluent that comes out of the agriculture portion leaves the aquaponics system and can be released or treated as needed, for example by a local sewage treatment plant 4.

According to an alternative embodiment, the effluent may (in whole or in part) be treated so that its properties are compatible with a return to the aquaculture portion. For example, a physicochemical treatment of the effluent may be carried out to give it certain properties close to those of the new water brought into the aquaculture loop. This allows the treated effluent to be integrated into the new water brought into the aquaculture loop. The treatment of the effluent may include the addition of a base. 5

The invention thus developed proposes a decoupled aquaponics system, the configuration and operating mode of which allows the farming of aquatic animals, in particular shrimp, at very high density in mildly salted water, which allows the soil-less cultivation of leafy plants and/or fruit plants, of high quality and with a high yield.

The invention claimed is:

1. A process for farming aquatic animals and for cultivating plants in an aquaponics system, the process including:

farming aquatic animals in an aquaculture portion (1) containing water with a salinity greater than 2 g/L, cultivating plants, supplied with nutrient solution by an irrigation system, the process being characterized in that the cultivation of the plants is carried out above ground, and in that the process includes:

measuring at least daily the salinity in the water of the aquaculture portion (1), and measuring at least daily the nitrates in the water of the aquaculture portion (1), and, if the salinity exceeds a given salinity threshold, or if the nitrates exceed a given nitrate threshold:

extracting water from the aquaculture portion (1), adding new water to the aquaculture portion (1), to compensate for the extracted water, the process further including preparing the nutrient solution, said nutrient solution including water extracted from the aquaculture portion (1).

2. The process according to claim 1, comprising storing water extracted from the aquaculture portion in a buffer tank (3).

3. The process according to claim 1, wherein the given salinity threshold is comprised between 3 g/L and 8 g/L, and the given nitrate threshold is comprised between 100 mg/L and 300 mg/L.

4. The process according to claim 1, wherein the preparation of the nutrient solution includes:

providing water extracted from the aquaculture portion (1), providing inputs, optionally providing fresh water, and mixing the water extracted from the aquaculture portion (1), the inputs (204) and optionally fresh water (207).

5. The process according to claim 1, the process including the preparation of two nutrient solutions, namely a first nutrient solution (205, 206) and a second nutrient solution (208), the preparation of the first nutrient solution (205, 206) including:

providing water extracted from the aquaculture portion (1), providing inputs (204) contained in a stock solution (203), and mixing the water extracted from the agriculture portion (2) and the stock solution (203), and diluting with fresh water (207);

the process including irrigating, by a first irrigation system, first plants with the first nutrient solution, the preparation of the second nutrient solution (208) including:

providing water extracted from the aquaculture portion (1)

providing drainage of the first irrigation system;

mixing the water extracted from the aquaculture portion (1) and the drainage of the first irrigation system and optionally adding inputs, the process including irrigating, by a second irrigation system, second plants with the second nutrient solution.

6. The process according to claim 3, wherein the inputs (204) include one or more of the following inputs:

calcium nitrate;

potassium nitrate;

monopotassium phosphate;

one or more organic inputs;

iron chelate;

mixture of trace elements;

manganese;

nitric acid;

hydrochloric acid;

sulfuric acid;

orthophosphoric acid.

* * * * *